W. H. SELLS.
BUTT REMOVER FOR CORN HUSKERS.
APPLICATION FILED DEC. 18, 1916.
1,312,361.
Patented Aug. 5, 1919.
2 SHEETS—SHEET 1.
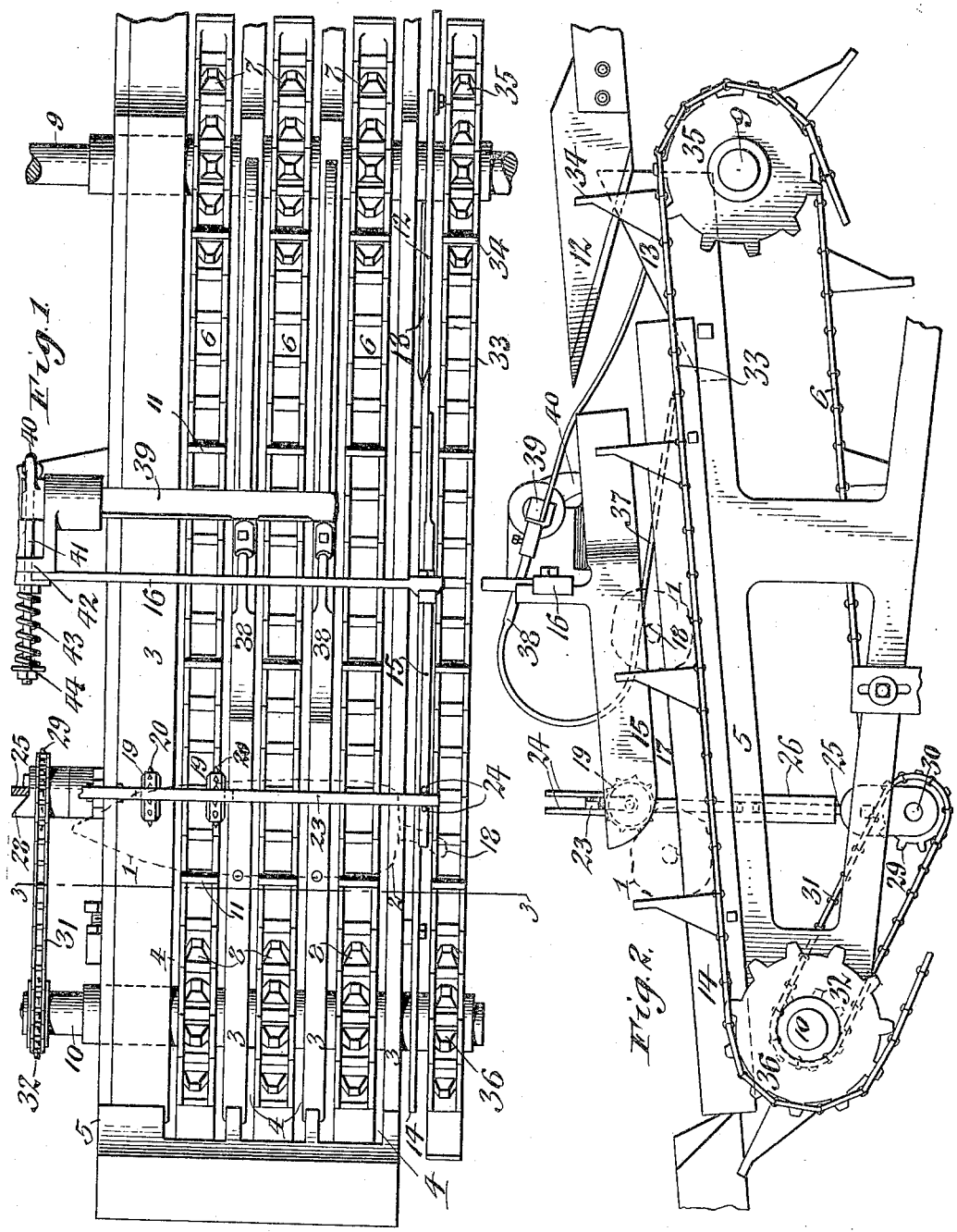
Inventor
William H. Sells
by
Geyer & Popp
Attorneys

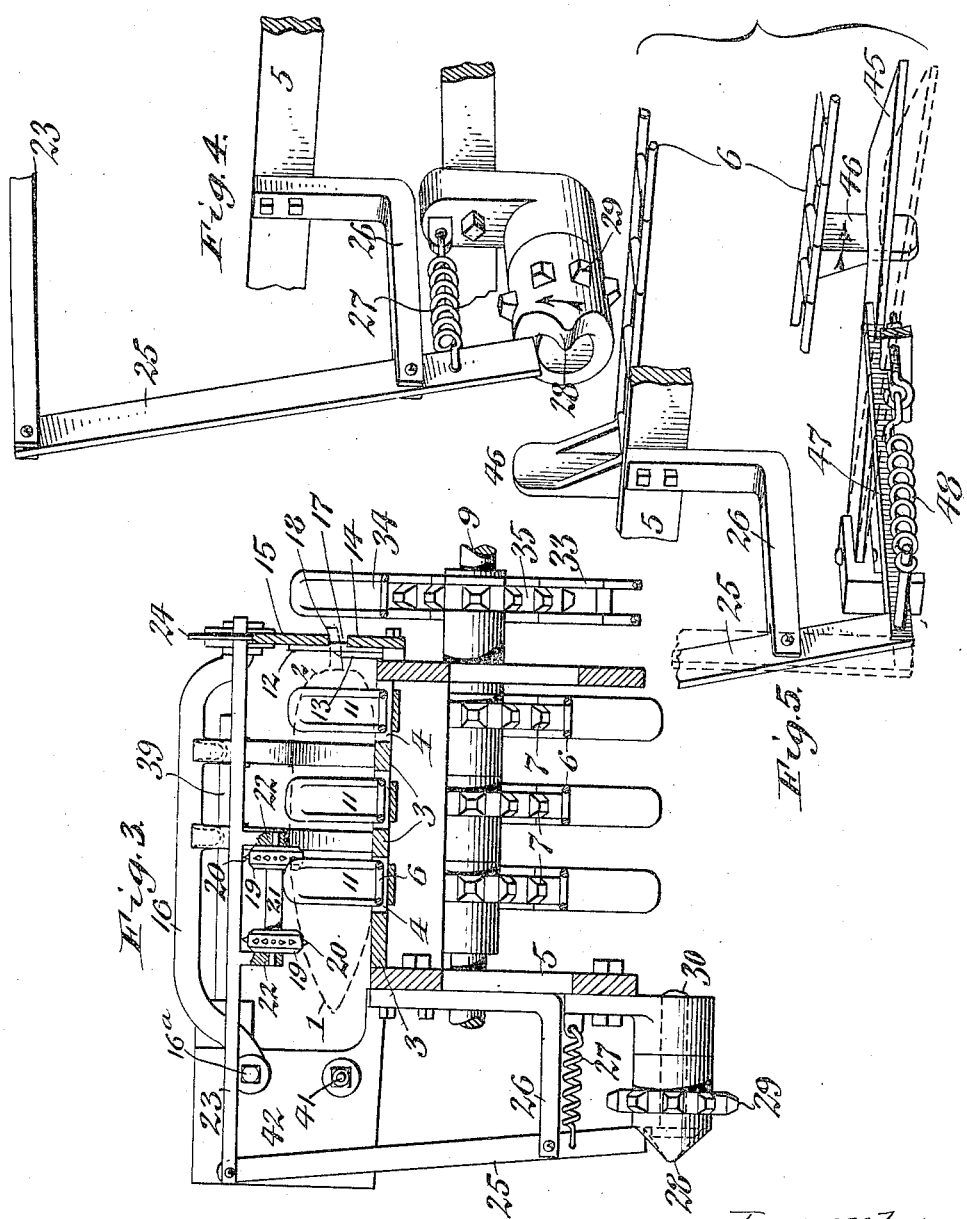

UNITED STATES PATENT OFFICE.

WILLIAM H. SELLS, OF BUFFALO, NEW YORK.

BUTT-REMOVER FOR CORN-HUSKERS.

1,312,361.　　　　Specification of Letters Patent.　　Patented Aug. 5, 1919.

Application filed December 18, 1916. Serial No. 137,527.

*To all whom it may concern:*

Be it known that I, WILLIAM H. SELLS, a citizen of the United States, residing at Buffalo, in the county of Erie and State of New York, have invented new and useful Improvements in Butt-Removers for Corn-Huskers, of which the following is a specification.

This invention relates to a butt remover for corn husking machines.

It has been found in practice that some operators do not always exercise care in placing the ears of corn on the conveyer which presents the ears of corn to the butt cutter with the result that such improperly presented ears are not cut off the requisite amount at their butt ends.

It is the object of this invention to provide simple and effective means for properly positioning the ears of corn on the conveyer preparatory to presenting the same to the butt cutter regardless of whether the same have been so positioned by the attendant.

In the accompanying drawings:

Figure 1 is a top plan view of a butt remover for corn husking machines equipped with one form of my improved ear positioning device. Fig. 2 is a side elevation of the same. Fig. 3 is a vertical transverse section thereof taken on the correspondingly numbered line in Fig. 1. Fig. 4 is a fragmentary perspective view of part of the ear positioning device shown in Figs. 1–3. Fig. 5 is a similar view showing a modified form of part of the ear positioning device.

Similar characters of reference indicate corresponding parts throughout the several views.

The ears 1 of corn which are to be cut off at their butt ends 2 are placed by the operator or attendant upon a feed table which preferably comprises a plurality of longitudinal bars 3 separated from each other by longitudinal slots 4, which bars are mounted in any suitable manner on the main frame 5 of the machine. These ears of corn while in a crosswise position relatively to the length of the feed table are moved bodily lengthwise of the same by means of a conveyer which may be of any suitable construction but preferably comprises an endless carrier having a plurality of main chain belts 6 the upper operative stretches of which move forwardly in the longitudinal slots between the bars 3 of the feed table while their lower inoperative stretches move backwardly underneath the table. The front and rear turns of these main belts pass around front and rear sprocket wheels 7, 8 which are mounted on front and rear shaft 9, 10 journaled in suitable bearings on the front and rear parts of the frame of the machine. These belts may be operated in any suitable manner by applying power to either the front shaft or the rear shaft. Each of the main conveyer belts is provided at intervals with feeding wings or fingers 11 and the corresponding wings of the several main belts are arranged transversely in line, so that they together form a set and operate simultaneously upon an ear of corn by engaging with the rear side of the latter and move the same bodily forward lengthwise of the machine after the operator has placed this ear transversely upon the rear or receiving part of the feed table.

Adjacent to one side of the ear conveyer is arranged a butt cutter against which the butt ends of the ears of corn are moved by the conveyer for the purpose of removing these butts. In the present case this butt cutter is arranged on the right hand side of the ear conveyer adjacent to the front end of the latter inasmuch as this is a right hand machine and the ears of corn are placed on the feed table with their butt ends arranged on the right hand side of the machine, but if desired the cutter may be arranged on the left hand side of the machine and the mechanism associated therewith reversed accordingly if it is desired to operate the same as a left hand machine. Although the butt cutter may be variously constructed that shown in the drawings comprises upper and lower blades 12, 13 which may be mounted in any suitable manner, so that their cutting edges converge toward the front end of the machine and are arranged in the path of the butt ends of the ears of corn as the latter are moved forwardly by the conveyer.

Preparatory to reaching the butt cutter the ears of corn are shifted transversely relatively to the feed table and conveyer and engaged at their butt ends with a gage which operates to determine the amount of material which is to be cut off from the butt ends of the ears. This gage is arranged lengthwise of the right hand side of the upper or operative part of the conveyer and laterally out of line with the butt cutter to an extent equal to the amount to be removed from the butt ends of the ears. In its preferred form this gage comprises a lower longitudinal gage bar 14 which is secured to the right hand side of the main frame and an upper longitudinal gage bar 15 arranged above the lower bar and supported by means of an overhanging bracket 16 from the opposite side of the main frame. The bracket 16 is preferably secured adjustably to the frame by means of a clamping screw or bolt 16ª which permits this bracket and upper bar to be raised and lowered to suit the size of the corn which is being trimmed. The upper and lower gage bars are separated from each other by an intervening longitudinal slot 17 which is in line with the point of intersection between the upper and lower cutter blades or substantially so. In the operation of the machine the butt ends of the ears of corn are adapted to engage with their upper and lower parts against the upper and lower gage bars while the stubs 18 of the ears of corn project laterally through the slot between the same so that the latter do not interfere with the operation of gaging the butt ends of the ears preparatory to cutting off the same by means of the butt cutter.

The improved ear positioning device whereby the ears of corn are shifted bodily transversely relatively to the feed table, conveyer and cutter and against the gage preparatory to trimming off the butt ends of the same is constructed as follows:

Above the path of the ears of corn are arranged one or more shifting rollers or wheels 19 two of which are shown in Figs. 1 and 3 although this number may be varied as desired. Each of these shifting rollers has its axis arranged horizontally and transversely relatively to the direction of movement of the conveyer. This shifting roller is capable of revolving about its axis and is also capable of rising and falling so as to adapt the same to the height or diameter of the different ears of corn upon engaging the upper sides of the latter and this shifting roller is also adapted to move bodily transversely of the direction of movement of the conveyer for the purpose of pushing the ears of corn successively crosswise of the conveyer and feed table until the butt ends of the ears engage the bars of the gage. For the purpose of increasing the hold of each of these shifting rollers on the ears of corn the same is provided on its periphery with an annular row of teeth or pins 20 which grip or dig in the upper surface of each ear of corn and cause the latter to be reliably shifted laterally on the conveyer together with the shifting roller while the same is moved in this direction. The two shifting rollers are preferably spaced apart about the distance between two of the main carrying belts and are arranged transversely in line and mounted upon a shaft 21 which is journaled in bearings 22, 22 depending from the underside of a shifting bar 23. The latter is normally arranged substantially horizontally and transversely above the path of the ears of corn and is capable of rising and falling and also moving transversely relatively to the direction of movement of the conveyer. For this purpose the right hand end of the shifting bar is guided preferably by means which comprise two upright guide pins 24 projecting upwardly from the top of the upper gage bar and forming between them a guideway or slot which receives the right hand end of the shifting bar. Upon adjusting the upper gage bar 15 vertically the shifting bar 23 of the positioning mechanism resting thereon is adjusted simultaneously vertically therewith. The transverse reciprocating motion of the shifting bar may be produced by various means those shown in the drawings comprising an upright rock lever 25 which is pivoted between its upper and lower arms on a bracket 26 arranged on the adjacent part of the main frame and its upper arm being pivotally connected with the left hand end of the shifting bar, as best shown in Figs. 3 and 4. The rocking motion of the lever 25 may also be effected in a variety of ways the means for this purpose shown in Figs. 1-4 comprising a spring 27 which connects the lower arm of the rock lever with the main frame and operates to move the same in one direction so that the shifting bar and the shifting rollers mounted thereon are moved toward the left and a rotatable cam 28 adapted to engage with the lower arm of the rock lever 25 and turn the latter in a direction for causing the shifting bar and the shifting rollers mounted thereon to be moved toward the right relatively to the direction of movement of the ear conveyer. The rotatable cam is preferably formed on or connected with a sprocket wheel 29 which is journaled on a pivot pin 30 mounted on the adjacent part of the main frame. This sprocket wheel receives one turn of a driving chain 31 which latter passes with its opposite turn around a driving sprocket wheel 32 mounted on the rear shaft 10 of the ear conveyed mechanism, as shown in Figs. 1 and 2.

After an ear of corn is placed on the feed table the same is moved forwardly by the wings of the conveyer. Upon reaching the shifting rollers or wheels this ear engages its upper side with these rollers so that the latter are turned and also raised more or less depending upon the height or diameter of the respective ear. While the shifting rollers are in engagement with the top of the ear of corn these rollers are moved bodily crosswise of the conveyer and compel the ear to move in the same direction by reason of the teeth of these rollers digging into the husks of the ears sufficiently to obtain a hold on the same. This transverse movement of the ear of corn under the action of the shifting rollers continues until the butt end of the ear rests against the gage bars. If the ears of corn engage the gage before the shifting rollers have completed their full stroke in the gaging direction then the teeth of these rollers during the last part of such movement operate to shred or loosen the husks and thereby facilitate the complete removal thereof by means which subsequently operate on the same. After the ear has been thus positioned against the gage and has passed forwardly clear of the shifting rollers the ear remains in its gaged position and is moved by the conveyer in a crosswise position to the cutter which is arranged in the path of the butt end of the ear and therefore operates to remove this butt. After the butt has been removed from the ear the latter is discharged from the front end of the conveyer and delivered to suitable means for removing the husks from the ear.

The transverse reciprocating movement of the shifting bar and the rollers mounted thereon is so timed that these members move toward the right just before a set of the feeding wings reach the ear positioning line on the machine, whereby the shifting of the ears in front of the wings takes place at the proper time against the gage preparatory to removing the butts from the same. If during the forward movement of the conveyer wings one or the other of the same should strike one of the shifting rollers the latter will simply rise together with its companion roller and the shifting bar and permit the respective wing to pass underneath without any injurious results.

In order to insure carrying the butt end of the ear of corn rearwardly past the cutter and prevent the ear from being shifted into an oblique position on the conveyer during the butt cutting operation an auxiliary conveyer is provided which in this instance comprises an auxiliary conveyer belt 33 arranged with its upper operative stretch lengthwise adjacent to the outer side of the lower gage bar and provided with a plurality of conveyer or feed wings 34 arranged in line with those of the main belts and adapted to engage with the butt ends of the ears of corn while the latter are passing the gage and the cutter. This auxiliary congage and the cutter. This auxiliary conveyer belt passes with its front and rear turn around front and rear sprocket wheels 35, 36 mounted at the right hand end of the front and rear shafts 9, 10 so that this belt operates in unison with the main conveyer belts.

After each ear of corn has been shifted transversely on the conveyer and against the gage the same is held in this position and prevented from becoming displaced by means of a pressing device which operates against the upper side of the ear and which preferably comprises a plurality of U-shaped springs the lower arms 37 of which are free and arranged in the path of the ears so as to engage with the upper sides of the same while the upper arms 38 thereof are mounted on a horizontal transverse rock shaft 39 which is journaled in a suitable bearing on the main frame and is yieldingly held in a position in which the lower spring arms are depressed. This spring retaining device comprises a tension arm 40 projecting downwardly from the rock shaft 39, a tension rod 41 connected with the tension arm and passing through a bracket 42 on the main frame, and a spring 43 surrounding the tension rod and bearing at one end against the bracket 42 and at its opposite end against a shoulder 44 on the tension rod, as shown in Fig. 1.

Instead of effecting the rocking motion of the lever by the rotary cam, as shown in Figs. 1-4, this motion may be obtained by the means which are shown in Fig. 5 and which comprises a horizontally swinging tappet arm 45 pivoted on the lower part of the main frame in such position that its free end is arranged in the path of the feed wings 46 on the lower stretch of one of the main conveyer belts, a link 47 connecting this tappet arm with the lower arm of the rock lever 25, and a spring 48 connecting this lower lever arm with the adjacent part of the main frame. In the operation of this last mentioned construction each feed wing 46 while passing rearwardly with the corresponding part of the respective main conveyer belt engages with the free end of the tappet arm and pushes the same from the position indicated by full lines to the position indicated by dotted lines and thereby causes the rock lever to be turned from the position indicated by full lines to the position indicated by dotted lines, in Fig. 5, thereby moving the shifting bar and rollers transversely of the conveyer toward the right and causing an ear of corn which at this time is being presented to the same by the conveyer to be shifted with its butt end against the gage preparatory to cutting off this end. When the lower return wing 46 clears the tappet arm the spring 48 returns this arm to a position across the path of the next following conveyer wing 46 and also turns the rock lever, so as to move the shifting rollers toward the left into a position preparatory to gaging the next following ear of corn.

This ear positioning device for corn huskers is comparatively simple in construction, the same is not liable to get out of order and it insures positioning of the ears successively and properly against the gage regardless of the care which may have been exercised by the operator in feeding the machine and thereby insures removing the proper amount of material from the butt ends of the ears so that the husks may be subsequently removed therefrom expeditiously and thoroughly.

We claim as our invention:

1. A butt remover comprising a cutter adapted to cut the butt ends of ears of corn, a longitudinally movable conveyer for moving said ears in a crosswise position past said cutter, and a positioning device for shifting said ears transversely relative to said conveyer and cutter comprising a shifting roller arranged above the path of the ears with its axis transversely of the direction of movement of said conveyer and adapted to engage with the upper side of said ears, and means for moving said shifting roller transversely relatively to the conveyer and cutter.

2. A butt remover comprising a cutter adapted to cut the butt ends of ears of corn, a longitudinally movable conveyer for moving said ears in a crosswise position past said cutter, and a positioning device for shifting said ears transversely relative to said conveyer and cutter comprising a shifting roller arranged above the path of the ears with its axis transversely of the direction of movement of said conveyer, said roller being provided on its periphery with teeth, and means for moving said shifting roller transversely relatively to the conveyer and cutter.

3. A butt remover comprising a cutter adapted to cut the butt ends of ears of corn, a longitudinally movable conveyer for moving said ears in a crosswise position past said cutter, and a positioning device for shifting said ears transversely relative to said conveyer and cutter comprising a shifting roller arranged above the path of the ears with its axis transversely of the direction of movement of said conveyer and adapted to engage with the upper side of said ears, and means for moving said shifting roller transversely relatively to the conveyer and cutter comprising a transversely movable shifting bar on which said roller is mounted.

4. A butt remover comprising a cutter adapted to cut the butt ends of ears of corn, a longitudinally movable conveyer for moving said ears in a crosswise position past said cutter, and a positioning device for shifting said ears transversely relative to said conveyer and cutter comprising a shifting roller arranged above the path of the ears with its axis transversely of the direction of movement of said conveyer and adapted to engage with the upper side of said ears, and means for moving said shifting roller transversely relatively to the conveyer and cutter comprising a transversely movable shifting bar on which said roller is mounted and a rock lever connected with said shifting bar.

5. A butt remover comprising a cutter adapted to cut the butt ends of ears of corn, a longitudinally movable conveyer for moving said ears in a crosswise position past said cutter, and a positioning device for shifting said ears transversely relative to said conveyer and cutter comprising a shifting roller arranged above the path of the ears with its axis transversely of the direction of movement of said conveyer and adapted to engage with the upper side of said ears, and means for moving said shifting roller transversely relatively to the conveyer and cutter comprising a transversely movable shifting bar on which said roller is mounted and a guide in which said bar is capable of sliding horizontally and moving vertically.

6. A butt remover comprising a cutter adapted to cut the butt ends of ears of corn, a longitudinally movable conveyer for moving said ears in a crosswise position past said cutter, and a positioning device for shifting said ears transversely relative to said conveyer and cutter comprising a shifting roller arranged above the path of the ears with its axis transversely of the direction of movement of said conveyer and adapted to engage with the upper side of said ears, and means for moving said shifting roller transversely relatively to the conveyer and cuttter comprising a transversely movable shifting bar on which said roller is mounted, a guide in which said bar is capable of sliding horizontally and moving vertically and means for reciprocating said bar.

7. A butt remover comprising a cutter adapted to cut the butt ends of ears of corn, a longitudinally movable conveyer for moving said ears in a crosswise position past said cutter, and a positioning device for shifting said ears transversely relative to said conveyer and cutter comprising a shifting roller arranged above the path of the ears with its axis transversely of the direction of movement of said conveyer and adapted to engage with the upper side of said ears, and means for moving said shifting roller transversely relatively to the conveyer and cutter comprising a transversely movable shifting bar on which said roller is mounted, a guide in which one end of said bar is capable of sliding horizontally and moving vertically, and a rock lever connected with the opposite end of said bar.

8. A butt remover comprising a cutter adapted to cut the butt ends of ears of corn, a longitudinally movable conveyer for moving said ears in a crosswise position past said cutter, and a positioning device for shifting said ears transversely relative to said conveyer and cutter comprising a shifting roller arranged above the path of the ears with its axis transversely of the direction of movement of said conveyer and adapted to engage with the upper side of said ears, and means for moving said shifting roller transversely relatively to the conveyer and cutter comprising a transversely movable shifting bar on which said roller is mounted, a guide in which one end of said bar is capable of sliding horizontally and moving vertically,—a rock lever connected with the opposite end of said bar and a cam operating on said lever.

9. A butt remover comprising a cutter adapted to cut the butt ends of ears of corn, a longitudinally movable conveyer for moving said ears in a crosswise position past said cutter, and a positioning device for shifting said ears transversely relative to said conveyer and cutter comprising a shifting roller arranged above the path of the ears with its axis transversely of the direction of movement of said conveyer and adapted to engage with the upper side of said ears, and means for moving said shifting roller transversely relatively to the conveyer and cutter comprising a transversely movable shifting bar on which said roller is mounted, a guide in which one end of said bar is capable of sliding horizontally and moving vertically, a rock lever connected with the opposite end of said bar, a rotatable cam engaging said lever and adapted to turn the same in one direction, and a spring connected with said lever and adapted to turn the same in the opposite direction.

10. A butt remover comprising a cutter adapted to cut the butt ends of ears of corn, a longitudinally movable conveyer for moving said ears in a crosswise position past said cutter, and a positioning device for shifting said ears transversely relative to said conveyer and cutter comprising a shifting roller arranged above the path of the ears with its axis transversely of the direction of movement of said conveyer and adapted to engage with the upper side of said ears, and means for moving said shifting roller transversely relatively to the conveyer and cutter comprising a transversely movable shifting bar on which said roller is mounted, a guide in which one end of said bar is capable of sliding horizontally and moving vertically, a rock lever connected with the opposite end of said bar, a rotatable cam engaging said lever and adapted to turn the same in one direction, and a spring connected with said lever and adapted to turn the same in the opposite direction, a sprocket wheel connected with said cam, and a driving chain passing around said sprocket wheel.

11. A butt remover comprising a cutter adapted to cut the butt ends of ears of corn, a longitudinally movable conveyer for moving said ears in a crosswise position past said cutter, and a positioning device for shifting said ears transversely relative to said conveyer and cutter comprising a pair of shifting rollers arranged side by side above the path of the ears of corn, and a transversely and vertically movable bar provided with depending bearings on which said rollers are pivotally mounted.

12. A butt remover comprising a cutter, a conveyer for moving the ears past said cutter, a gage against which the butt end of the corn is moved preparatory to being trimmed and which comprises a lower longitudinal member and a vertically movable upper longitudinal member, and positioning means for moving the ears of corn laterally on said conveyer and toward said gage and having a member supported on said upper gage member and movable vertically therewith.

13. A butt remover comprising a cutter, a conveyer for moving the ears past said cutter, a gage against which the butt end of the corn is moved preparatory to being trimmed and which comprises a lower longitudinal member and a vertically movable upper longitudinal member and positioning means for moving the ears of corn laterally on said conveyer and toward said gage and having a member supported on said upper gage member.

14. A butt remover comprising a cutter, a conveyer for moving the ears past said cutter, a gage against which the butt end of corn is moved preparatory to being trimmed and which comprises a lower longitudinal member and a vertically movable upper longitudinal member and positioning means for moving the ears of corn laterally on said conveyer and toward said gage and having a member supported on said upper gage member and movable therewith.

15. A butt remover comprising a cutter, a conveyer for moving the ears past said cutter, a gage against which the butt end of the corn is moved preparatory to being trimmed, and which comprises a lower member and a movable upper member, and positioning means for moving the ears laterally on said conveyer and toward said gage and having a member supported on said upper gage member.

WILLIAM H. SELLS.

Copies of this patent may be obtained for five cents each, by addressing the "Commissioner of Patents, Washington, D. C."